United States Patent
Marks

[11] 3,848,178
[45] Nov. 12, 1974

[54] COMBINED POWER AND INSTRUMENT POTENTIAL TRANSFORMER

[75] Inventor: Louis W. Marks, Pittsfield, Mass.
[73] Assignee: General Electric Company
[22] Filed: Dec. 9, 1971
[21] Appl. No.: 206,549

[52] U.S. Cl. .................. 323/6, 317/14 R, 323/45, 323/61, 324/110
[51] Int. Cl. .................. G05f 7/00, G01r 19/16
[58] Field of Search .......... 323/6, 44 R, 48, 50, 45, 323/57, 60, 61; 324/55, 110, 127; 317/14 A, 14 R

[56] References Cited
UNITED STATES PATENTS

| | | | |
|---|---|---|---|
| 3,061,828 | 10/1962 | Hauck | 323/6 UX |
| 3,497,793 | 2/1970 | Gasparini et al. | 323/48 X |
| 3,523,238 | 8/1970 | Jones | 323/6 |
| 3,534,247 | 10/1970 | Miljanic | 324/55 X |
| 3,546,565 | 12/1970 | Downing, Jr. et al. | 323/6 |

Primary Examiner—Gerald Goldberg
Attorney, Agent, or Firm—Francis X. Doyle; John J. Kelleher; Volker R. Ulbrich

[57] ABSTRACT

A potential transformer having a low voltage metering winding and an auxiliary low voltage power winding on a single core with a common primary winding is provided with a current transformer in the auxiliary low voltage power winding that, in turn, develops a voltage across a compensating impedance located in the circuit associated with the low voltage metering winding that is proportional to the current in the auxiliary low voltage power winding for the purpose of compensating the metering winding for load current drop in the primary winding.

4 Claims, 3 Drawing Figures

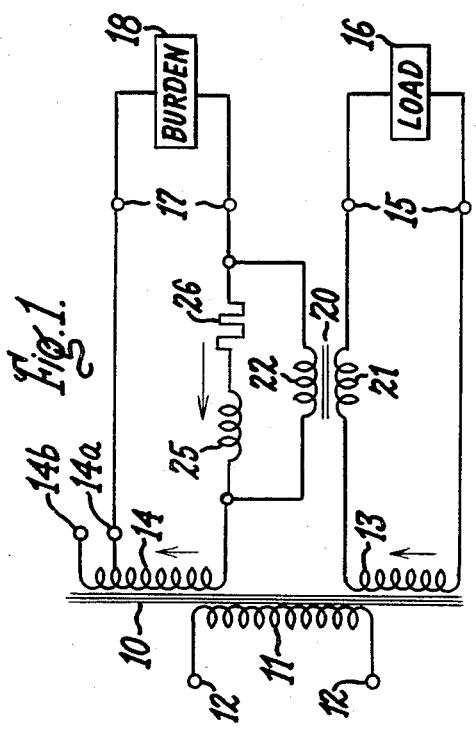
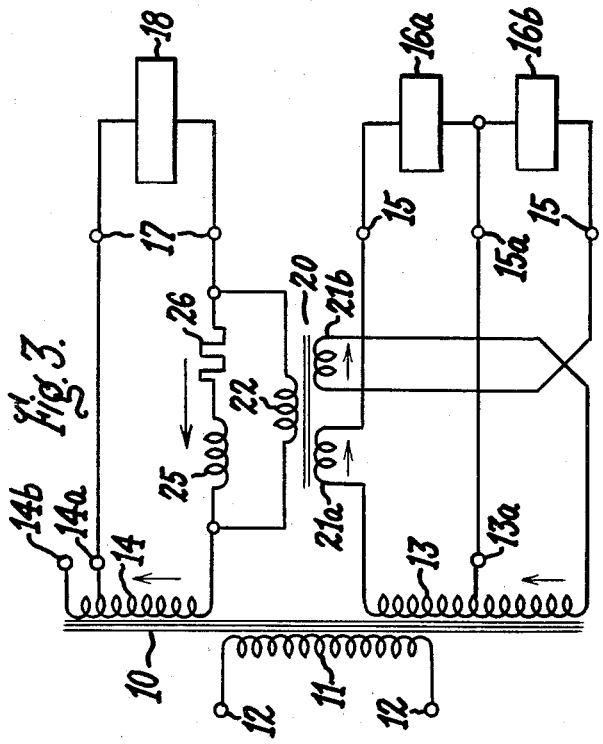
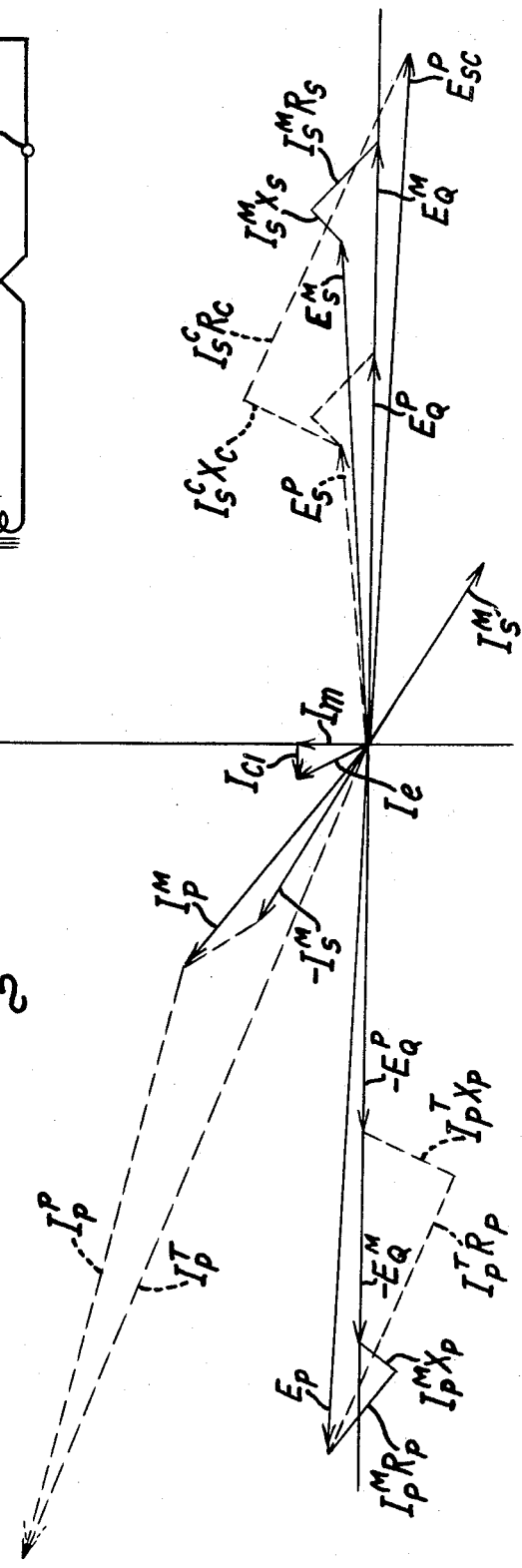
Fig.1.
Fig.2.
Fig.3.

COMBINED POWER AND INSTRUMENT POTENTIAL TRANSFORMER

My invention relates to combined power and instrument potential transformers, and particularly to high accuracy potential transformers having both power secondary and potential measuring windings energized through a common core from a single primary winding. The invention concerns improved means for simplifying construction and improving accuracy of the potential transformer portion and enabling its use while supplying secondary power to a load circuit.

Potential transformer designed for measurement of high transmission line voltages while insulating the metering secondary or measuring winding from the high primary potential are usually coupled directly to a high voltage line rather than to the low voltage side of a power transformer. Such direct metering of the higher voltage line is desirable in the interest of metering accuracy and is necessary to ensure constant energization of a potential transformer in installations where the associated power transformers may be disconnected from the line. However, in installations where it is necessary to provide permanent connection of any power transformer to a high voltage line, as for control power where only the high voltage line feeds a station, there are economic advantages in metering the line potential from the low voltage side of a power transformer. Such arrangements have been known and are described in an article in AIEE Transactions, 1956, at page 606 et seq. The secondary voltage potential transformer described in the foregoing article is a device separate from the power transformer and thus requires a separate core and separate primary winding.

In other installations where the amount of permanently connected power is relatively small it is known to add to a potential transformer an auxiliary secondary winding for transmission of power. Such a power secondary winding, however, draws a relatively large power component of current in the common primary winding and thus introduces into the metering winding a voltage error so large that accurate metering can be carried out only with the power winding disconnected. It is desirable in some cases that such a combined transformer be left permanently connected to a power load and that simultaneous metering operation be available.

Accordingly, it is a principal object of my invention to provide a combined power and potential transformer operable to measure input potential with metering accuracy while simultaneously transmitting power through a separate secondary winding.

It is a more particular object of my invention to provide, a combined power and instrument potential transformer having a common core and primary winding, compensating means for enabling accurate measurement of input potential while transmitting power to a separate load circuit.

In carrying out my invention in one preferred embodiment I provide a combined power and instrument potential transformer having a single core and common primary winding with a power secondary winding and at least one instrument secondary winding. The instrument secondary winding is compensated for voltage drop in the primary winding by adding, in aiding series circuit relation with the instrument secondary winding voltage, a voltage proportional to total impedance drop in the primary winding. Specifically this is accomplished by deriving from the secondary power circuit a current proportional to secondary power current and passing this current through a compensating inductance and compensating resistance in series. The compensating impedances have substantially the same impedance ratio as the ratio of like impedances in the primary winding and are connected in series with the instrument secondary winding in aiding voltage relation.

My invention will be more fully understood and its several objects and advantages further appreciated by referring now to the following detailed specification taken in conjunction with the accompanying drawings in which:

FIG. 1 is a schematic circuit diagram of a combined power and instrument potential transfomer embodying my invention;

FIG. 2 is a diagrammatic vectorial representation of typical current and voltage quantities representing the characteristic relationship of such quantities in the primary winding and the instrument secondary winding of the transformer shown at FIG. 1, both with and without power current compensation in accordance with my invention; and FIG. 3 is a schematic circuit diagram of a combined power and instrument potential transformer embodying my invention as applied to a transformer having a center tapped power secondary winding subject to umbalanced loads.

Referring now to the drawing and particularly to FIG. 1, I have shown a combined power and instrument potential transformer comprising a magnetizable core 10, a high voltage primary winding 11 having input terminals 12, a low voltage power secondary winding 13, and a low voltage instrument secondary winding 14 having selectable voltage taps 14a and 14b. By way of example the primary winding 11 may be designed for an input voltage of the order of 69 to 230 kv while the power secondary winding 13 may have a rated voltage of 240 volts and the instrument secondary winding 14 provided with voltage taps at 69 and 115 volts.

At FIG. 1 I have shown the power secondary winding 13 connected through a pair of load terminals 15 to an electrical load 16 and the intrument secondary winding 14 connected through a pair of output terminals 17 to a metering burden or load 18. Directional arrow on the secondary windings 13 and 14 indicate the direction relation of voltages induced in these windings by flux in the core 10.

As described above, flow of load current through the power secondary winding 13 produces such a large voltage drop in the primary winding 11 that the instrument secondary winding 14, unless compensated for primary voltage drop, would provide a highly inaccurate indication of the primary voltage magnitude and phase. To provide suitable compensation in the instrument secondary circuit for such power circuit voltage drop in the primary winding I connect in series circuit relation with the instrument secondary winding 14 between the output terminals 17 a source of compensating voltage proportional in magnitude to current flowing in the secondary power circuit. To this end I couple the secondary power circuit to the secondary instrument circuit through a current transformer 20 having a primary winding 21 connected in series with power secondary winding 13 between load terminals 15.

Across a secondary winding 22 of current transformer 20 I connect a compensating inductance 25 and a compensating resistor 26 in series circuit relation and I connect these compensating impedances 25 and 26 in series with instrument secondary winding 14 across the instrument output terminals 17. The compensating impedances 25 and 26 are so connected between the instrument output terminals that the voltage drop developed across these impedances by the current transformer 20 is in aiding voltage relation with the induced voltage in the instrument secondary winding 14, as indicated by the directional arrows. It will be evident that the compensating voltage across the impedance element 25 and 26 is proportional in magnitude to the power current flowing through the power secondary winding 13. The required impedance values of these compensating impedances will become apparent as this description proceeds.

The mode of operation of a transformer embodying our invention, and particularly the effect of the compensating impedances and the power-to-instrument circuit coupling described above, will now be described by reference to the vector diagram at FIG. 2.

At FIG. 2 the mutual core flux (common to both the primary winding and all secondary windings on core 10) is shown a vector $\phi$ extending upward at 90° to the base line. The exciting current $I_e$ leads the flux vector by an acute angle and, as is well known, comprises a magnetizing component $I_m$ and a core loss component $I_{cl}$. The voltage induced in the secondary winding 14 by the mutual flux $\phi$ is represented by vector $E_Q$ and the component of primary voltage required to overcome the induced voltage is shown as $-E_Q$. Applied primary voltage is represented by the vector $E_P$ and terminal voltage across the instrument secondary winding 14 is represented by the vector $E_S$. Superscripts M and P applied hereinafter to the foregoing and other vector quantities shown at FIG. 2 signify, respectively, the value of such vectors when only a metering burden is connected (M) and when both metering and power loads are connected (P).

It may now be observed from FIG. 2 that a current $I^M{}_S$ flowing in the instrument secondary circuit through the metering burden 18 and lagging a secondary voltage $E^M{}_S$ results in a primary current $I^M{}_P$ when no current is flowing through the power secondary winding 13. As indicated in the drawing $I^M{}_P$ is the vector sum of $I_e$ and $-I^M{}_S$. As is well known to those skilled in the art, such primary current $I^M{}_P$ results in resistive and inductive voltage drops $I^M{}_P R_P$ and $I^M{}_P X_P$, respectively, in the primary circuit, and induces a voltage $E^M{}_Q$ in the secondary instrument winding 14. The current $I^M{}_S$ through the winding 14 produces resistive and inductive voltage drops $I^M{}_S R_S$ and $I^M{}_S X_S$, respectively, so that the secondary terminal voltage of the winding 14 with current flowing only through the metering burden 18 is represented by a vector $E^M{}_S$. While $E^M{}_S$ is displaced somewhat in phase and slightly less in magnitude than the applied voltage $E_P$, these ratio and phase angle errors may be compensated by means well known to those skilled in the art, as illustrated and described, for example, in my U.S. Pat. No. 3,532,964 issued on Oct. 6, 1970.

At FIG. 2 I have also illustrated (in broken lines) the effect on instrument secondary winding voltage error when load current flows through the power secondary winding 13 while metering current is being supplied also to the burden 18. For this purpose I have illustrated at FIG. 2 a power component of primary current $I^P{}_P$ added to the metering component of primary current $I^M{}_P$ when the secondary power circuit is drawing current. This power component of primary current is of course many times larger than the metering component of primary current and its greater magnitude is not proportionately shown at FIG. 2. The total primary current resulting from the imposition of a large power current component in the primary winding is identified at FIG. 2 as $I^T{}_P$.

It may now be observed that when total primary current includes a large power component the resistive and inductive voltage drops, $I^T{}_P R_P$ and $I^T{}_P X_P$ in the primary circuit result in a greatly diminished induced voltage $E^P{}_Q$ in the instrument secondary winding 14. Without load current compensation in accordance with my invention the resistive and inductive voltage drops in the instrument secondary winding due to the current $I^M{}_S$ flowing therethrough result in a secondary terminal $E^P{}_S$ across the winding 14 which has magnitude and/or phase angle errors much greater (with respect to the primary voltage $E_P$) than does the secondary voltage $E^M{}_S$ (i.e., when no power current is flowing).

To compensate for the large load current error described above, I interpose in the instrument secondary circuit, in aiding relationship with the voltage induced in the instrument secondary winding 14, a compensating voltage drop generated across the compensating impedances 25 and 26 as a proportionate result or power current through the secondary winding 13 (and thus essentially proportional to the total current $I^T{}_P$ in the primary wind 11). At FIG. 2 the compensating voltage drops across the compensating reactance 25 and compensating resistance 26 are represented by vectors $I^C{}_S X_C$ and $I^C{}_S R_C$, where $I^C{}_S$ is compensating current in transformer secondary winding 22, $X_C$ is compensating inductance (25) and $R_C$ is compensating resistance (26). These voltage drops are added vectorially to the voltage $E^P{}_S$ across the secondary winding 14 under load conditions and result in a compensated instrument output voltage at terminals 17, shown at FIG. 2 as $E^P{}_{Sc}$.

It will be evident that by selecting the magnitude of the compensating impedances 25 and 26 the phase and magnitude of the interposed compensating voltage across the elements 25 and 26 may be so predetermined that the instrument output voltage $E^P{}_{Sc}$ under load conditions is a substantially exact replica in phase and magnitude to the primary voltage $E_p$ which it is intended to measure. From FIG. 2 it may be observed that the compensating inductance 25 and resistance 26 should have an impedance ratio generally the same as the ratio of primary winding inductance to primary winding resistance, (i.e., $X_C/R_C$ should be approximately equal to $X_P/R_P$) and that these impedances should be of such absolute magnitude that the total vectorial voltage drop across them results in a desired magnitude and phase position of the compensated voltage $E^P{}_{Sc}$ across the secondary winding 14 under power and metering load conditions.

It will now be evident that in a combined power and intrument transformer compensated in accordance with my invention, it is necessary to provide load current compensation only for impedance drop in the primary winding, and that impedance drop in the power secondary winding 13 is of no effect. It will, of course, be apparent to those skilled in the art that the coupling current transformer 20 has both ratio and phase angle errors of its own, and that these discrepancies produce errors in compensation if the current transformer is not of high quality. It will also be understood that the compensating impedance 25, 26 in the instrument secondary winding circuit produces an added metering error when the power secondary winding is not carring current. By suitable adjustment of the current transformer 20 and compensating impedance 25, 26 this error may be at least partially corrected when power current does flow through the load 16.

It may now be observed that, as compared to potential transformer metering at the low voltage side of a separate power transformer, my combined power and instrument potential transformer presents certain simplications and advantages in respect to compensation of no-load error. While the load current compensating circuit I have described provides compensation only when power current is flowing and is most accurate when metering current is also being supplied to the burden 18, the instrument secondary winding 14 must also be compensated for no-load errors in ratio and phase angle. Such no-load errors in the instrument secondary circuit are well known to those skilled in the art and depend upon voltage (as distinguished from current) magnitude. Where a potential transformer is connected as a separate instrument across the secondary terminals of a power transformer, it is necessary that both transformers be compensated for no-load error and that the characteristics of both transformers be known to determine such compensation. In my combined transformer it is necessary to compensate only the instrument secondary winding 14 for no-load error.

At FIG. 3 I have shown another embodiment of my invention wherein the power secondary winding 13 is provided with a center tap 13a and separate power loads 16a and 16b are connected, respectively, between a common load terminal 15a and separate load terminals 15. To take account of a condition where the power loads 16a and 16b are unequal so that current flows through the winding mid-tap 13a it is desirable that the compensating current transformer 20 be responsive to current at both terminal ends of the power secondary winding 13. This may be done as illustrated at FIG. 3 by providing two primary windings 21a and 21b in aiding magnetic relation on the current transformer 20, one primary winding being connected to each terminal end of the power winding 13.

While I have shown and described certain preferred embodiments of my invention by way of illustration, many modifications will occur to those skilled in the art, and I therefore wish to have it understood that I intend in the appended claims to cover all such modifications as fall within the true spirit and scope of my invention.

What I claim and desire to secure by Letters Patent of the United States is:

1. A combined power and instrument potential transformer comprising a magnetizable core, a single high voltage primary winding on said core having a pair of input terminals, an instrument secondary winding on said core adapted to supply across a pair of output terminals a low voltage proportional in magnitude and similar in phase to voltage applied to said input terminals, a power secondary winding on said core having opposite ends connected to a pair of load terminals, a current transformer having a primary winding connected in series circuit relation with said power secondary winding across said load terminals and including a secondary compensating winding, a compensating impedance connected across said secondary compensating winding, and means connecting said conpensating impedance in series circuit relation with said instrument secondary winding between said output terminals, said compensating impedance being so connected that voltage drop thereacross resulting from current in said secondary compensating winding is in aiding voltage relation with voltage induced in said instrument secondary winding by flux in said core.

2. A transformer according to claim 1 wherein said compensating impedance comprises inductance and resistance connected in series circuit relation and having an impedance ratio substantially the same as the like ratio of primary winding inductance and resistance.

3. A transformer according to claim 1 wherein said compensating impedance comprises inductance and resistance in series circuit relation and of such magnitude and ratio that the vectorial sum of voltage induced in said instrument secondary winding and compensating current voltage drop across said impedance is substantially equal in magnitude and opposite in phase to voltage applied to said input terminals.

4. A transformer according to claim 1 wherein said power secondary winding has an intermediate point connected to a common load terminal, said common load terminal being adapted to supply load current to separate load circuits between said common terminals and each of said pair of load terminals, and wherein said current transformer has two primary windings disposed in aiding magnetic relation and connected respectively between end points of said power secondary winding and one terminal of said pair of load terminals.

* * * * *